(12) United States Patent
Tysman et al.

(10) Patent No.: US 11,215,241 B2
(45) Date of Patent: Jan. 4, 2022

(54) CLUTCH ASSEMBLIES WITH BALANCE CAVITIES FORMED BY DISC SPRINGS

(71) Applicant: ALLISON TRANSMISSION, INC., Indianapolis, IN (US)

(72) Inventors: John L. Tysman, Zionsville, IN (US); Jason Ellis, Clayton, IN (US); Evan Chivington, West Lafayette, IN (US); Mickey Hunt, Camby, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 0 days.

(21) Appl. No.: 17/149,053

(22) Filed: Jan. 14, 2021

(65) Prior Publication Data
US 2021/0140491 A1 May 13, 2021

Related U.S. Application Data

(63) Continuation of application No. 16/405,525, filed on May 7, 2019, now Pat. No. 10,895,289.

(51) Int. Cl.
*F16D 25/12* (2006.01)
*F16D 25/0638* (2006.01)

(52) U.S. Cl.
CPC ......... *F16D 25/12* (2013.01); *F16D 25/0638* (2013.01)

(58) Field of Classification Search
CPC .............................. F16D 25/12; F16D 25/0638
See application file for complete search history.

(56) References Cited

U.S. PATENT DOCUMENTS

| | | | |
|---|---|---|---|
| 5,887,690 A * | 3/1999 | Haupt | F16D 21/06 192/48.611 |
| 7,001,298 B2 * | 2/2006 | Biermann | F16D 25/14 475/116 |
| 8,613,682 B2 | 12/2013 | Beckner et al. | |
| 2009/0071787 A1 | 3/2009 | Hemphill | |

* cited by examiner

*Primary Examiner* — David J Hlavka
(74) *Attorney, Agent, or Firm* — Taft Stettinius & Hollister LLP; Stephen F. Rost

(57) ABSTRACT

Transmissions and clutch assemblies for transmissions are disclosed herein. A transmission includes an input shaft, an output shaft, and a clutch assembly. The input shaft is configured to receive rotational power. The output shaft is configured to transmit rotational power to a load. The clutch assembly is coupled between the input shaft and the output shaft to selectively transmit rotational power therebetween in use of the transmission. The clutch assembly includes a housing, a piston, and a disc spring. The piston is movable relative to the housing and cooperates with the housing to at least partially define a first cavity that is configured to receive hydraulic fluid such that a first centrifugal pressure force is created in use of the clutch assembly. The disc spring is movable relative to the housing.

18 Claims, 3 Drawing Sheets

CLUTCH ASSEMBLIES WITH BALANCE CAVITIES FORMED BY DISC SPRINGS

RELATED APPLICATIONS

This application is a continuation of U.S. patent application Ser. No. 16/405,525, filed May 7, 2019, the disclosure of which is hereby incorporated by reference in its entirety.

FIELD OF THE DISCLOSURE

The present disclosure relates, generally, to clutch assemblies, and, more specifically, to clutch assemblies incorporating disc springs.

BACKGROUND

In use of rotating clutches, supply of hydraulic fluid to a first cavity to cause movement of a piston or the like may be associated with generation of a first centrifugal pressure force. In some cases, centrifugal pressure forces may cause, or otherwise be associated with, undesirable movement of a piston or similar component. To resist such movement, hydraulic fluid may be supplied to a second cavity of a rotating clutch to generate a second centrifugal pressure force that counteracts the first centrifugal pressure force. Devices and/or means for providing cavities that may be used to generate counteracting centrifugal pressure forces remain an area of interest.

SUMMARY

The present disclosure may comprise one or more of the following features and combinations thereof.

According to one aspect of the present disclosure, a transmission may include an input shaft, an output shaft, and a clutch assembly. The input shaft may be configured to receive rotational power. The output shaft may be configured to transmit rotational power to a load. The clutch assembly may be coupled between the input shaft and the output shaft to selectively transmit rotational power therebetween in use of the transmission. The clutch assembly may have a housing, a piston, and a disc spring. The piston may be movable relative to the housing, and the piston may cooperate with the housing to at least partially define a first cavity that is configured to receive hydraulic fluid such that a first centrifugal pressure force is created in use of the clutch assembly. The disc spring may be movable relative to the housing, and the disc spring may cooperate with at least one of the housing and the piston to at least partially define a second cavity that is configured to receive hydraulic fluid such that a second centrifugal pressure force is created that at least partially counteracts the first centrifugal pressure force in use of the clutch assembly.

In some embodiments, the clutch assembly may include a diaphragm in contact with the disc spring, and the diaphragm may be configured to at least partially conform to the shape of the disc spring in response to movement of the disc spring relative to the housing in use of the clutch assembly. A first side of the disc spring may contact the diaphragm and a second side of the disc spring arranged opposite the first side may contact a retaining ring of the clutch assembly, and the retaining ring may be constrained against movement relative to the housing in an axial direction. The retaining ring may at least partially seal the second cavity adjacent an inner diameter of the disc spring to resist leakage of hydraulic fluid from the second cavity in use of the clutch assembly.

In some embodiments, the first side of the disc spring may face the piston. Additionally, in some embodiments, the diaphragm may cooperate with the disc spring, the housing, and the piston to at least partially define the second cavity. Further, in some embodiments still, the clutch assembly may include a sealing element that contacts the diaphragm and the piston to at least partially seal the second cavity adjacent an outer diameter of the disc spring to resist leakage of hydraulic fluid from the second cavity in use of the clutch assembly.

In some embodiments, the clutch assembly may include a spring seat arranged in contact with the piston and the disc spring, and the spring seat may cooperate with the disc spring and the piston to at least partially define the second cavity. The clutch assembly may include a sealing element arranged in contact with the spring seat and the disc spring to seal the second cavity adjacent an outer diameter of the disc spring to resist leakage of hydraulic fluid from the second cavity in use of the clutch assembly.

In some embodiments, the clutch assembly may include a spring seat in contact with the disc spring and a retaining ring that is affixed to the housing such that the spring seat is constrained against axial movement relative to the housing. The clutch assembly may include a sealing element arranged in contact with the disc spring and the spring seat to at least partially seal the second cavity adjacent an inner diameter of the disc spring to resist leakage of hydraulic fluid from the second cavity in use of the clutch assembly.

In some embodiments, the second cavity may at least be partially defined by only one piston included in the clutch assembly. Additionally, in some embodiments, the disc spring may be movable relative to the housing in response to movement of the piston relative to the housing in use of the clutch assembly.

According to another aspect of the present disclosure, a rotating clutch assembly for a transmission may include a housing, a piston, and a disc spring. The piston may be movable relative to the housing, and the piston may cooperate with the housing to at least partially define a first cavity that is configured to receive hydraulic fluid such that a first centrifugal pressure force is created in use of the clutch assembly. The disc spring may be movable relative to the housing, and the disc spring may cooperate with at least one of the housing and the piston to at least partially define a second cavity that is configured to receive hydraulic fluid such that a second centrifugal pressure force is created that at least partially counteracts the first centrifugal pressure force in use of the clutch assembly.

In some embodiments, the clutch assembly may include a diaphragm in contact with the disc spring that is configured to at least partially conform to the shape of the disc spring in response to movement of the disc spring relative to the housing in use of the clutch assembly, and the diaphragm may cooperate with the disc spring, the housing, and the piston to at least partially define the second cavity.

In some embodiments, the clutch assembly may include a spring seat arranged in contact with the piston and the disc spring that cooperates with the disc spring and the piston to at least partially define the second cavity, and the clutch assembly may include a sealing element arranged in contact with the spring seat and the disc spring to seal the second cavity adjacent to an outer diameter of the disc spring to resist leakage of hydraulic fluid from the second cavity in use of the clutch assembly.

In some embodiments, the second cavity may at least be partially defined by only one piston included in the clutch assembly, and the disc spring may be movable relative to the housing in response to movement of the piston relative to the housing in use of the clutch assembly.

According to yet another aspect of the present disclosure, a rotating clutch assembly for a transmission may include a housing, a piston, a disc spring, and a diaphragm. The piston may be movable relative to the housing, and the piston may cooperate with the housing to at least partially define a first cavity that is configured to receive hydraulic fluid such that a first centrifugal pressure force is created in use of the clutch assembly. The disc spring may be movable relative to the housing. The diaphragm may be in contact with the disc spring. The disc spring and the diaphragm may cooperate with at least one of the housing and the piston to at least partially define a second cavity that is configured to receive hydraulic fluid such that a second centrifugal pressure force is created that at least partially counteracts the first centrifugal pressure force in use of the clutch assembly.

In some embodiments, the diaphragm may be configured to at least partially conform to the shape of the disc spring in response to movement of the disc spring relative to the housing in use of the clutch assembly. A first side of the disc spring may contact the diaphragm and face the piston and a second side of the disc spring arranged opposite the first side may contact a retaining ring of the clutch assembly, and the retaining ring may be constrained against movement relative to the housing in an axial direction.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
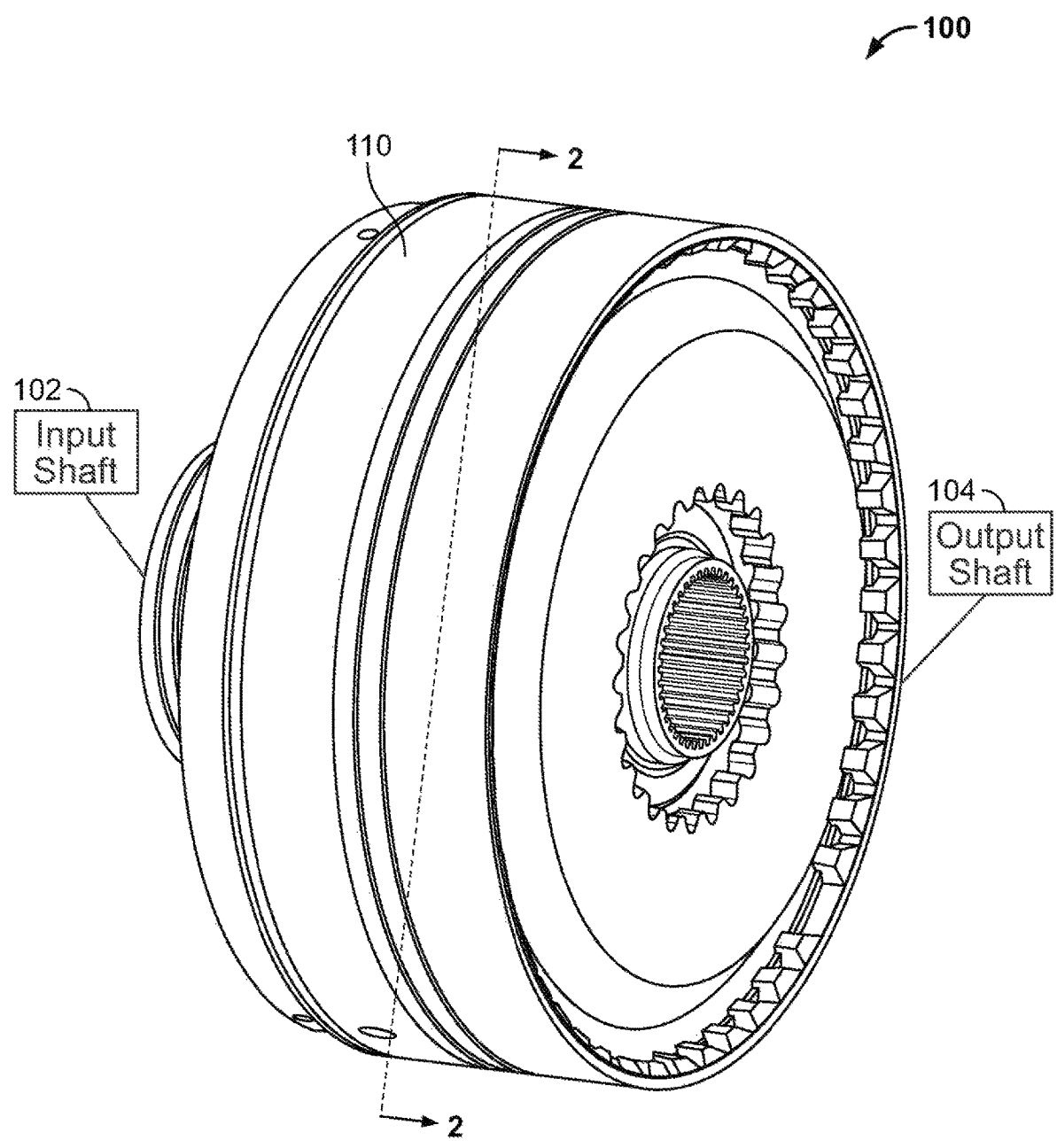
FIG. 1 is a partially diagrammatic view of a transmission.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative transmission 100 includes a number of components that are depicted diagrammatically for the sake of simplicity and/or clarity. Those components include, but are not limited to, an input shaft 102 and an output shaft 104. The input shaft 102 is configured to receive rotational power from a rotational power source (not shown) such as a motor or drive unit, for example. The output shaft 104 is configured to transmit rotational power provided to the input shaft 102 to a load (not shown) such as a differential and/or one or more wheels, for example. In the illustrative embodiment, a clutch assembly 110 is coupled between the input shaft 102 and the output shaft 104 to selectively transmit rotational power therebetween in use of the transmission 100. The clutch assembly 110 is illustratively embodied as, or otherwise includes, a rotating clutch assembly 110.

It should be appreciated that the illustrative transmission 100, and the clutch assembly 110 thereof, are adapted for a variety of uses. The transmission 100 and the clutch assembly 110 may be adapted for use as powertrain and/or drivetrain components of a vehicle usable in a variety of applications. In one respect, the transmission 100 and the clutch assembly 110 may be adapted for use as components of an agricultural harvesting vehicle, which may be used in in lawn and garden, construction, landscaping and ground care, golf and sports turf, forestry, engine and drivetrain, and government and military applications, for example. In that respect, the transmission 100 and the clutch assembly 110 may be included in, or otherwise adapted for use with, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, generators, and marine engines, among other suitable equipment.

Figure 2:
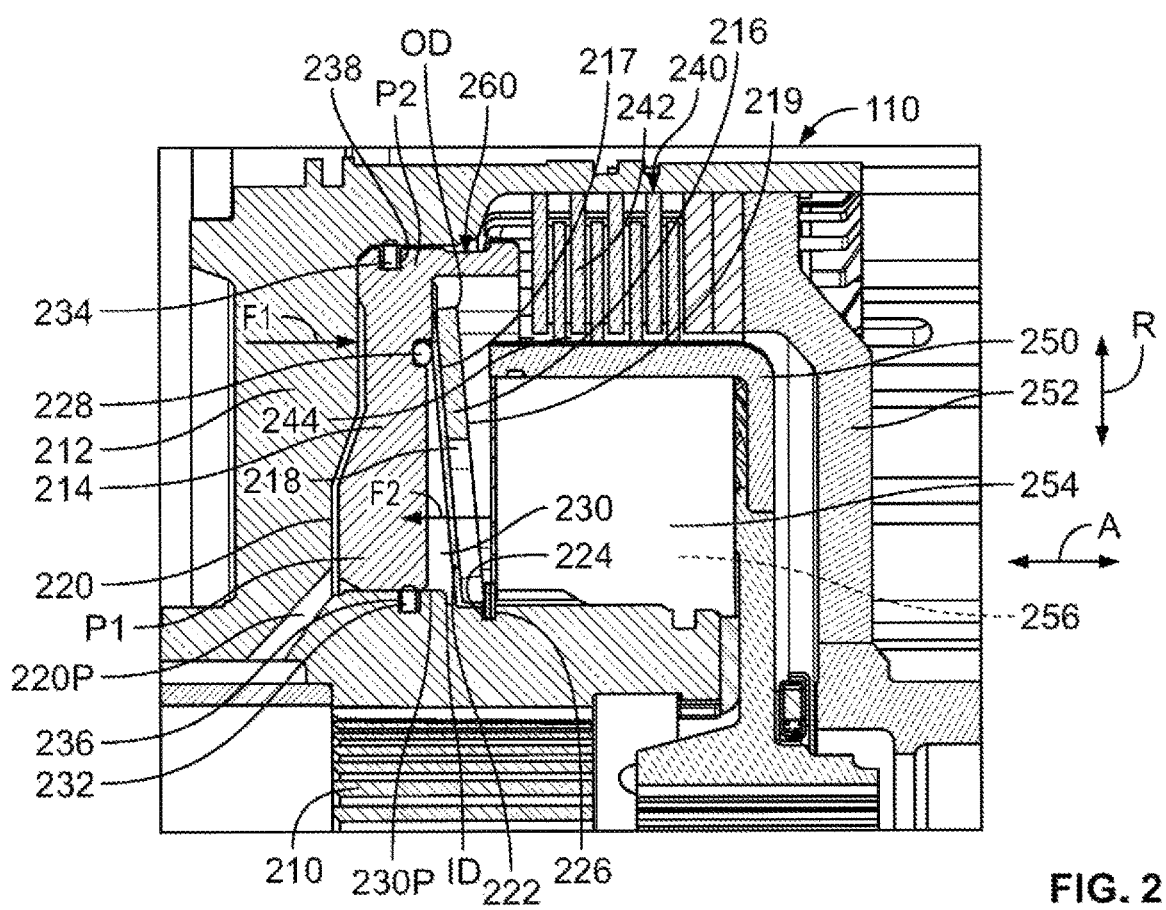
FIG. 2 is a sectional view taken about line 2-2 of a clutch assembly adapted for use in the transmission of FIG. 1, with the clutch assembly in a disengaged state.

Referring now to FIG. 2, the illustrative clutch assembly 110 includes a housing 212, a piston 214, and a disc spring 216. The housing 212 may be formed separately from, or integrally with, a main housing (not shown) of the transmission 100 that houses the input shaft 102 and the output shaft 104, among other things. The piston or apply piston 214 and the disc spring 216 are each movable relative to the housing 212. The piston 214 cooperates with the housing 212 to at least partially define a cavity 220 that is configured to receive hydraulic fluid such that a centrifugal pressure force F1 is created in use of the clutch assembly 110 (e.g., as a result of movement of hydraulic fluid in the cavity 220). The disc spring 216 cooperates with at least one of the housing 212 and the piston 214 to at least partially define a cavity 230 that is configured to receive hydraulic fluid such that a centrifugal pressure force F2 is created (e.g., as a result of movement of hydraulic fluid in the cavity 230) that at least partially counteracts the centrifugal pressure force F1 in use of the clutch assembly 110.

The illustrative clutch assembly 110 includes a diaphragm 222 arranged in contact with the disc spring 216. The diaphragm 222 is configured to at least partially conform to the shape of the disc spring 216 in response to movement of the disc spring 216 relative to the housing 212 in use of the clutch assembly 110. To facilitate such conformance, the diaphragm 222 may be formed from one or more materials capable of resilient deflection and/or deformation, such as one or more polymeric materials, for example. Of course, it should be appreciated that the diaphragm 222 may have another construction suitable for conformance with the shape of the disc spring 216 in use of the clutch assembly 110.

In the illustrative embodiment, the diaphragm 222 cooperates with the disc spring 216, the housing 212, and the piston 214 to at least partially define the cavity 230. Because the centrifugal pressure force F2 at least partially counteracts the centrifugal pressure force F1 in use of the clutch assembly 110, forces associated with the cavity 230 may be said to balance forces associated with the cavity 220. In that sense, the cavity 230 may be said to be a balance cavity. In any case, the cavity 230 is at least partially defined by only one piston (i.e., the piston 214) included in the clutch assembly 110.

The illustrative clutch assembly 110 does not include a balance piston or balance dam separate from the piston 214 which may be present in conventional configurations. Consequently, unlike other configurations, the balance cavity 230 is defined without provision of a balance piston or a balance dam to do so. Provision of the disc spring 216 and the diaphragm 222 in the illustrative clutch assembly 110 obviates any need for a separate balance piston or a balance dam.

In the illustrative embodiment, the disc spring 216 is formed to include features 218 that might permit the flow of hydraulic fluid (e.g., hydraulic fluid received in the cavity 230) through the disc spring 216 if the diaphragm 222 was omitted from the clutch assembly 110. The features 218 may include, or otherwise be embodied as, fingers or slots, for example. Regardless, to resist leakage of hydraulic fluid from the cavity 230 through the disc spring 216 in use of the clutch assembly 110, the diaphragm 222 is mated with the disc spring 216 to close off the features 218.

An illustrative side 217 of the disc spring 216 contacts the diaphragm 222 and faces the piston 214. The side 217 is arranged opposite a side 219 of the disc spring 216 that contacts a retaining ring 224 of the illustrative clutch assembly 110. The retaining ring 224 seats in a notch 226 formed in the housing 212 such that the retaining ring 224 is constrained against movement relative to the housing 212 in an axial direction indicated by arrow A. As a result, the retaining ring 224 constrains the disc spring 216 and the diaphragm 222 against movement relative to the housing 212 in the axial direction A in use of the clutch assembly 110.

The illustrative cavity 230 is sealed by the retaining ring 224 and a sealing element 228 arranged outward of the retaining ring 224 in a radial direction indicated by arrow R. The retaining ring 224 at least partially seals the cavity 230 adjacent an inner diameter ID of the disc spring 216 to resist leakage of hydraulic fluid from the cavity 230 in use of the clutch assembly 110. The sealing element 228 contacts the diaphragm 222 and the piston 214 to at least partially seal the cavity 230 adjacent an outer diameter OD of the disc spring 216 to resist leakage of hydraulic fluid from the cavity 230 in use of the clutch assembly 110. The sealing element 228 may be embodied as, or otherwise include, any one of a number of suitable sealing elements, such as a rope seal, an O-ring, a labyrinth seal, a gasket, a diaphragm seal, a boss seal, a face seal, or the like, for example.

In the illustrative embodiment, the cavity 220 is sealed adjacent a radially-innermost portion P1 of the piston 214 and adjacent a radially-outermost portion P2 of the piston 214. More specifically, the cavity 220 is at least partially sealed adjacent the portion P1 by a retainer 232 and adjacent the portion P2 by a retainer 234. The retainer 232 is received by a notch 236 formed in the housing 212 and the retainer 234 is received by a notch 238 formed in the piston 214. The retainers 232, 234 may each be embodied as, or otherwise include, any element suitable to at least partially seal the cavity 220 to resist leakage of hydraulic fluid therefrom in use of the clutch assembly 110, and also suitable to accommodate movement of the piston 214 relative to the housing 212 in the axial direction A in use of the clutch assembly 110. For example, in some embodiments, the retainers 232, 234 may each be embodied as, or otherwise include, a rope seal, an O-ring, a labyrinth seal, a gasket, a diaphragm seal, a boss seal, a face seal, or the like.

Feed ports 220P, 230P formed in the housing 212 are illustratively fluidly coupled to the respective cavities 220, 230 to supply hydraulic fluid thereto in use of the clutch assembly 110. It should be appreciated that hydraulic fluid may be conducted through the clutch assembly 110 (e.g., through a central shaft 210 thereof) so that hydraulic fluid may be provided to the ports 220P, 230P in use of the clutch assembly 110. Furthermore, it should be appreciated that hydraulic fluid supplied to the cavities 220, 230 by the respective feed ports 220P, 230P may be exhausted, evacuated, or otherwise expelled from the cavities 220, 230 by discharge ports (not shown) in use of the clutch assembly 110.

The illustrative clutch assembly 110 includes a clutch pack 240 configured for selective interaction with the piston 214 as described in greater detail below. The clutch pack 240 is arranged between the housing 212 and a clutch hub 250. In the illustrative embodiment, the clutch pack 240 includes friction plates 242 and reaction plates 244 interposed between the friction plates 242. The friction plates 242 and the reaction plates 244 are coupled to a backing plate 252. It should be appreciated that in some embodiments, the friction plates 242 may be biased away from the reaction plates 244 by one or more biasing elements (not shown). In any case, the friction plates 242 may be configured for selective interaction with the reaction plates 244 to permit the clutch pack 240 to selectively transmit rotational power in use of the clutch assembly 110. More specifically, the friction plates 242 may be configured for selective interaction with the reaction plates 244 to permit the clutch pack 240 to selectively transmit rotation power from an input of the clutch assembly 110 (e.g., the clutch hub 250) to an output of the clutch assembly 110 (e.g., the backing plate 252) in use thereof. Therefore, in the illustrative embodiment, the clutch hub 250 and the backing plate 252 provide an input and an output, respectively, of the clutch assembly 110.

In the illustrative embodiment, a radial space 254 is arranged between the clutch hub 250 and the housing 212. In some embodiments, a system (not shown) separate from the arrangement incorporating the disc spring 216 may be positioned in the radial space 254. In such embodiments, the separate system may be positioned in the radial space 254 adjacent to, and/or in contact with, the retaining ring 224.

Operation of the illustrative clutch assembly 110 in a disengaged state 260 will now be described with reference to FIG. 2. In the illustrative disengaged state 260 of the clutch assembly 110, hydraulic fluid is supplied to the cavity 220 via the feed port 220P such that the piston 214 is spaced from the clutch pack 240 (i.e., the friction plates 242 of the clutch pack 240) in the axial direction A. Consequently, no rotational power is transmitted through the clutch pack 240 (e.g., from the clutch hub 250 to the backing plate 252) when the clutch assembly 110 is in the disengaged state 260. To counteract the centrifugal force F1 that may be associated with movement of hydraulic fluid provided to the cavity 220 when the piston 214 is in the position shown in FIG. 2, hydraulic fluid may be supplied to the cavity 230 to create the centrifugal force F2. It should be appreciated that the illustrative clutch assembly 110 may include, or otherwise be adapted for use with, an electro-hydraulic control system (not shown) having a controller communicatively coupled to one or more valves (e.g., solenoid valves) such that control signals provided to the one or more valves by the controller may direct actuation of the one or more valves to supply hydraulic fluid to, and exhaust hydraulic fluid from, the cavities 220, 230 via the feed ports 220P, 230P.

Figure 3:
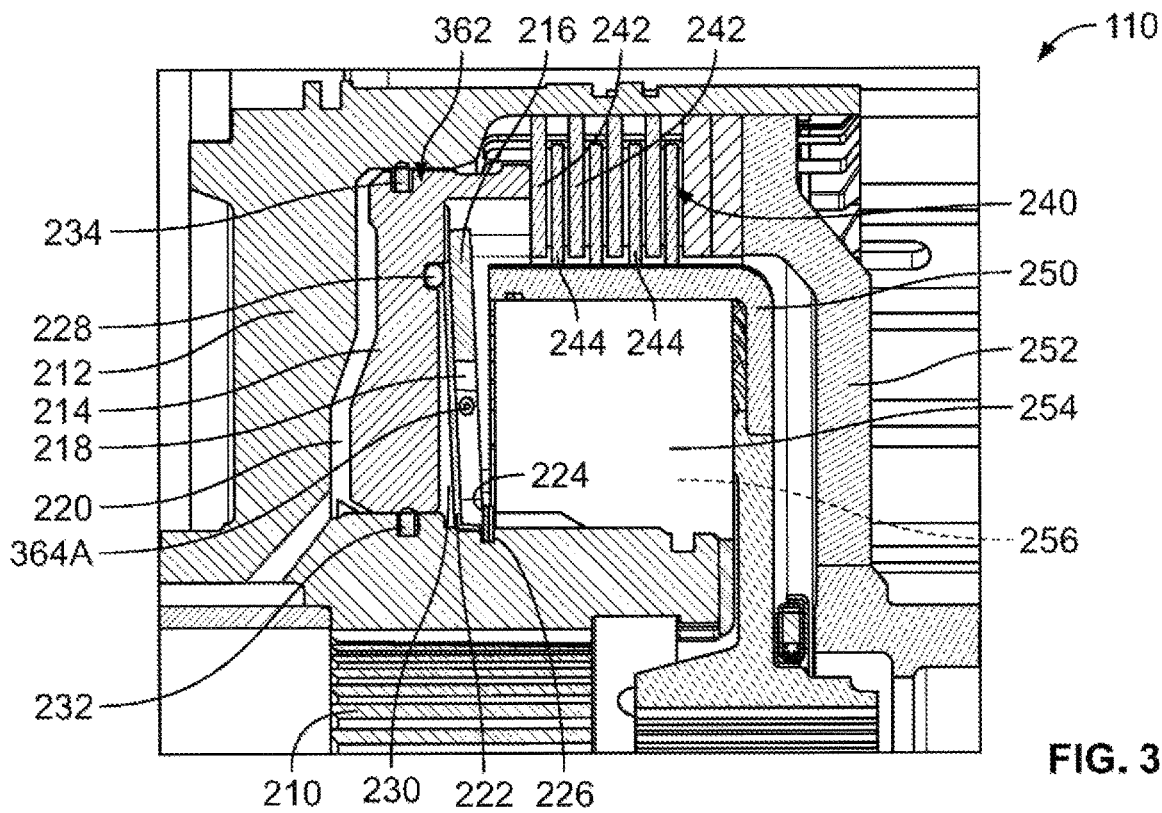
FIG. 3 is a sectional view of the clutch assembly shown in FIG. 2, with the clutch assembly in an engaged state.

Referring now to FIG. 3, operation of the illustrative clutch assembly 110 in an engaged state 362 will now be described. In the illustrative engaged state 362 of the clutch assembly 110, hydraulic fluid is supplied to the cavity 220 via the feed port 220P to advance the piston 214 to the right in the axial direction A (i.e., relative to the position of the piston 214 shown in FIG. 2) such that the piston 214 is in contact with the clutch pack 240 (i.e., one of the friction plates 242 of the clutch pack 240). Due at least in part to axial force provided by the piston 214, rotational power may be transmitted through the clutch pack 240 (e.g., from the clutch hub 250 to the backing plate 252) when the clutch assembly 110 is in the engaged state 362. In response to movement of the piston 214 to the right in the axial direction A relative to the housing 212, the diaphragm 222 and the disc spring 216 move together relative to the housing 212. That is, the diaphragm 222 and the disc spring 216 rotate together about an axis 364A that extends into the page such that the diaphragm 222 and the disc spring 216 are substantially more upright when the clutch assembly 110 is in the engaged state 362 than when the clutch assembly 110 is in the disengaged state 260. To counteract the centrifugal force F1 that may be associated with movement of hydraulic fluid provided to the cavity 220 when the piston 214 is in the position shown in FIG. 3, hydraulic fluid may be supplied to the cavity 230 to create the centrifugal force F2.

Figure 4:
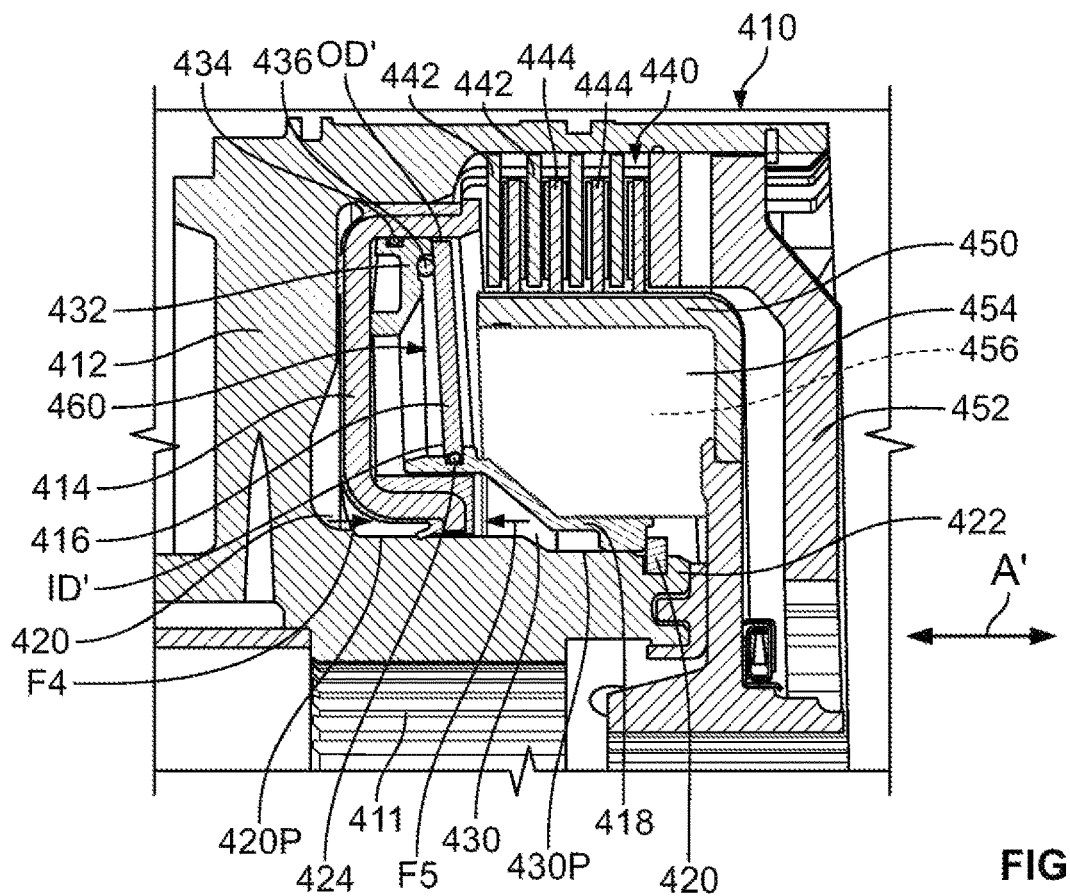
FIG. 4 is a sectional view of another clutch assembly adapted for use in a transmission, with the clutch assembly in a disengaged state.

Referring now to FIG. 4, an illustrative clutch assembly 410 is adapted for use with, and may be included in, the transmission 100, at least in some embodiments. The illustrative clutch assembly 410 includes a housing 412, a piston 414, and a disc spring 416. The housing 412 may be formed separately from, or integrally with, a main housing (not shown) of the transmission 100. The piston or apply piston 414 and the disc spring 416 are each movable relative to the housing 412. The piston 414 cooperates with the housing 412 to at least partially define a cavity 420 that is configured to receive hydraulic fluid such that a centrifugal pressure force F4 is created in use of the clutch assembly 410 (e.g., as a result of movement of hydraulic fluid in the cavity 420). The disc spring 416 cooperates with at least one of the housing 412 and the piston 414 to at least partially define a cavity 430 that is configured to receive hydraulic fluid such that a centrifugal pressure force F5 is created (e.g., as a result of movement of hydraulic fluid in the cavity 430) that at least partially counteracts the centrifugal pressure force F4 in use of the clutch assembly 410.

In the illustrative embodiment, the disc spring 416, the housing 412, and the piston 414 cooperate to at least partially define the cavity 430. Because the centrifugal pressure force F5 at least partially counteracts the centrifugal pressure force F4 in use of the clutch assembly 410, forces associated with the cavity 430 may be said to balance forces associated with the cavity 420. In that sense, the cavity 430 may be said to be a balance cavity. In any case, the cavity 430 is at least partially defined by only one piston (i.e., the piston 414) included in the clutch assembly 410.

The illustrative clutch assembly 410 does not include a balance piston or balance dam separate from the piston 414 which may be present in conventional configurations. Consequently, unlike other configurations, the balance cavity 430 is defined without provision of a balance piston or a balance dam to do so. Provision of the disc spring 416 in the illustrative clutch assembly 410 obviates any need for a separate balance piston or a balance dam.

In the illustrative embodiment, the disc spring 416 is formed without features (such as features 218) that might permit the flow of hydraulic fluid (e.g., hydraulic fluid received in the cavity 430) through the disc spring 216. Accordingly, the illustrative clutch assembly 410 omits a diaphragm (e.g., such as the diaphragm 222).

The illustrative clutch assembly 410 includes a spring seat 418 that cooperates with the disc spring 416, the housing 412, and the piston 414 to at least partially define the cavity 430. The spring seat 418 provides a connection interface between the disc spring 416 and the housing 412 and is arranged adjacent an inner diameter ID' of the disc spring 416 in contact with the disc spring 416 and a retaining ring 420 that is affixed to the housing 412. As a result, the spring seat 418 is constrained against movement relative to the housing 412 in an axial direction indicated by arrow A'. In some embodiments, the spring seat 418 may provide one or more sealing features that facilitate sealing of the cavity 430. The retaining ring 420 seats in a notch 422 formed in the housing 412. Consequently, the retaining ring 420 constrains the disc spring 416 against movement relative to the housing 412 in the axial direction A' in use of the clutch assembly 410.

The illustrative clutch assembly 410 includes a sealing element 424 arranged in contact with the disc spring 416 and the spring seat 418 to at least partially seal the cavity 430. That is, the sealing element 424 is arranged in contact with the disc spring 416 and the spring seat 418 to at least partially seal the cavity 430 adjacent the inner diameter ID' of the disc spring 416 to resist leakage of hydraulic fluid from the cavity 430 in use of the clutch assembly 410. The sealing element 424 may be embodied as, or otherwise include, any one of a number of suitable sealing elements, such as a rope seal, an O-ring, a labyrinth seal, a gasket, a diaphragm seal, a boss seal, a face seal, or the like, for example.

The illustrative clutch assembly 410 includes a spring seat 432 that cooperates with the spring seat 418, the disc spring 416, the housing 412, and the piston 414 to at least partially define the cavity 430. The spring seat 432 has a generally C-shaped cross-section and is arranged in contact with the piston 414 and the disc spring 416. The spring seat 432 provides a connection interface between the piston 414 and the disc spring 416 and, in some embodiments, may provide one or more sealing features that facilitate sealing of the cavity 430. A sealing element 434 is arranged radially between the spring seat 432 and the piston 414. In addition, a sealing element 436 is arranged in contact with the spring seat 432 and the disc spring 416 to seal the cavity 430 adjacent an outer diameter OD' of the disc spring 416 to resist leakage of hydraulic fluid from the cavity 430 in use of the clutch assembly 410. Each of the sealing elements 434, 436 may be embodied as, or otherwise include, any one of a number of suitable sealing elements, such as a rope seal, an O-ring, a labyrinth seal, a gasket, a diaphragm seal, a boss seal, a face seal, or the like, for example.

Feed ports 420P, 430P formed in the housing 412 are illustratively fluidly coupled to the respective cavities 420, 430 to supply hydraulic fluid thereto in use of the clutch assembly 410. It should be appreciated that hydraulic fluid may be conducted through the clutch assembly 410 (e.g., through a central shaft 411 thereof) so that hydraulic fluid may be provided to the ports 420P, 430P in use of the clutch assembly 410. Furthermore, it should be appreciated that hydraulic fluid supplied to the cavities 420, 430 by the respective feed ports 420P, 430P may be exhausted, evacuated, or otherwise expelled from the cavities 420, 430 by discharge ports (not shown) in use of the clutch assembly 410.

The illustrative clutch assembly 410 includes a clutch pack 440 configured for selective interaction with the piston 414 as described in greater detail below. The clutch pack 440 is arranged between the housing 412 and a clutch hub 450. In the illustrative embodiment, the clutch pack 440 includes friction plates 442 and reaction plates 444 interposed between the friction plates 442. The friction plates 442 and the reaction plates 444 are coupled to a backing plate 452. It should be appreciated that in some embodiments, the friction plates 442 may be biased away from the reaction plates 444 by one or more biasing elements (not shown). In any case, the friction plates 442 may be configured for selective interaction with the reaction plates 444 to permit the clutch pack 440 to selectively transmit rotational power (e.g., to the backing plate 452) in use of the clutch assembly 410. More specifically, the friction plates 442 may be configured for selective interaction with the reaction plates 444 to permit the clutch pack 440 to selectively transmit rotation power from an input of the clutch assembly 410 (e.g., the clutch hub 450) to an output of the clutch assembly 410 (e.g., the backing plate 452) in use thereof. Therefore, in the illustrative embodiment, the clutch hub 450 and the backing plate 452 provide an input and an output, respectively, of the clutch assembly 410.

In the illustrative embodiment, a radial space 454 is arranged between the clutch hub 450 and the housing 412. In some embodiments, a system (not shown) separate from the arrangement incorporating the disc spring 416 may be positioned in the radial space 454. In such embodiments, the separate system may be positioned in the radial space 454 adjacent to, and/or in contact with, the spring seat 418.

Operation of the illustrative clutch assembly 410 in a disengaged state 460 will now be described with reference to FIG. 4. In the illustrative disengaged state 460 of the clutch assembly 410, hydraulic fluid is supplied to the cavity 420 via the feed port 420P such that the piston 414 is spaced from the clutch pack 440 (i.e., the friction plates 442 of the clutch pack 440) in the axial direction A'. Consequently, no rotational power is transmitted through the clutch pack 440 (e.g., from the clutch hub 450 to the backing plate 452) when the clutch assembly 410 is in the disengaged state 460. To counteract the centrifugal force F4 that may be associated with movement of hydraulic fluid provided to the cavity 420 when the piston 414 is in the position shown in FIG. 4, hydraulic fluid may be supplied to the cavity 430 to create the centrifugal force F5. It should be appreciated that the illustrative clutch assembly 410 may include, or otherwise be adapted for use with, an electro-hydraulic control system (not shown) having a controller communicatively coupled to one or more valves (e.g., solenoid valves) such that control signals provided to the one or more valves by the controller may direct actuation of the one or more valves to supply hydraulic fluid to, and exhaust hydraulic fluid from, the cavities 420, 430 via the feed ports 420P, 430P.

Figure 5:
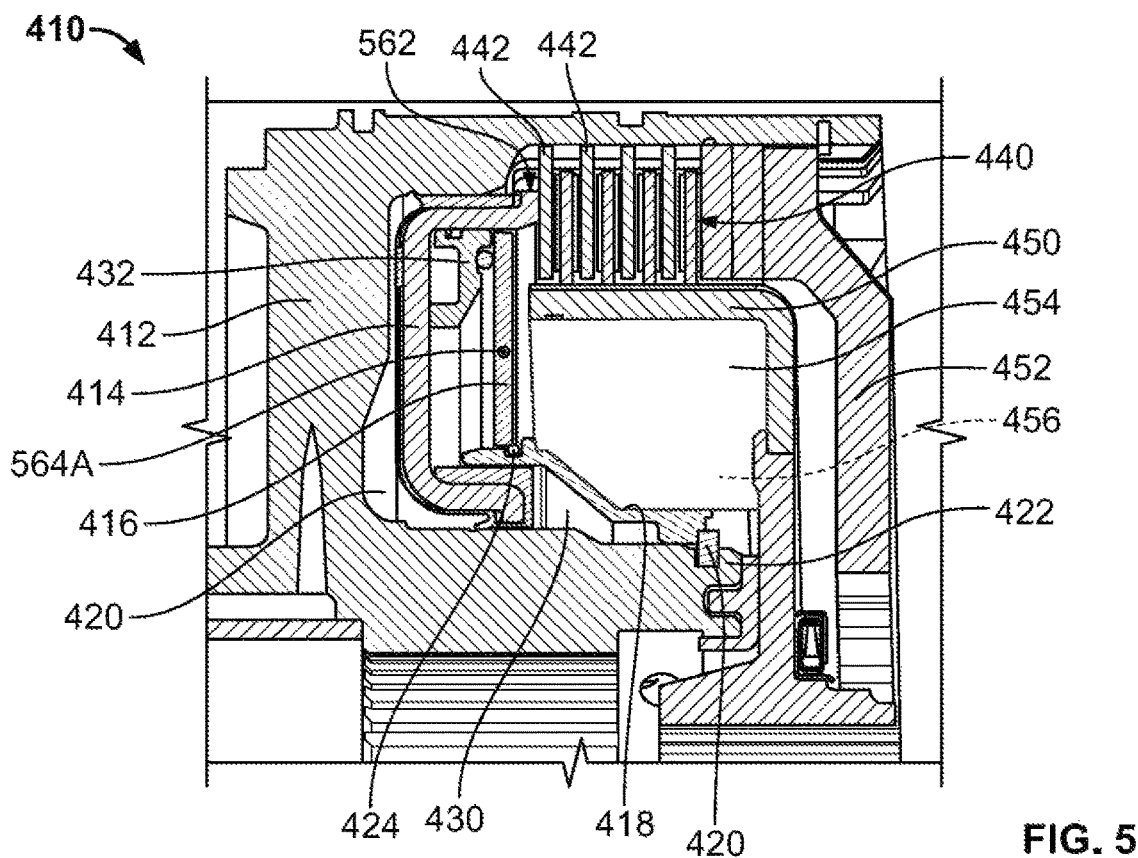
FIG. 5 is a sectional view of the clutch assembly shown in FIG. 4, with the clutch assembly in an engaged state.

Referring now to FIG. 5, operation of the illustrative clutch assembly 410 in an engaged state 562 will now be described. In the illustrative engaged state 562 of the clutch assembly 410, hydraulic fluid is supplied to the cavity 420 via the feed port 420P to advance the piston 414 to the right in the axial direction A' (i.e., relative to the position of the piston 414 shown in FIG. 4) such that the piston 414 is in contact with the clutch pack 440 (i.e., one of the friction plates 442 of the clutch pack 440). Due at least in part to axial force provided by the piston 414, rotational power may be transmitted through the clutch pack 440 (e.g., from the clutch hub 450 to the backing plate 452) when the clutch assembly 410 is in the engaged state 562. In response to movement of the piston 414 to the right in the axial direction A' relative to the housing 412, the disc spring 416 moves relative to the housing 412. That is, the disc spring 416 rotates about an axis 564A that extends into the page such that the disc spring 416 is substantially more upright when the clutch assembly 410 is in the engaged state 562 than when the clutch assembly 410 is in the disengaged state 460. To counteract the centrifugal force F4 that may be associated with movement of hydraulic fluid provided to the cavity 420 when the piston 414 is in the position shown in FIG. 5, hydraulic fluid may be supplied to the cavity 430 to create the centrifugal force F5.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A transmission comprising:
   an input shaft configured to receive rotational power;
   an output shaft configured to transmit rotational power to a load; and
   a clutch assembly coupled between the input shaft and the output shaft to selectively transmit rotational power therebetween in use of the transmission, the clutch assembly including
      a housing,
      a piston movable relative to the housing, wherein the piston cooperates with the housing to at least partially define a first cavity that is configured to receive hydraulic fluid such that a first centrifugal pressure force is created in use of the clutch assembly,
      a disc spring movable relative to the housing, wherein the disc spring cooperates with at least one of the housing and the piston to at least partially define a second cavity that is configured to receive hydraulic fluid such that a second centrifugal pressure force is created that at least partially counteracts the first centrifugal pressure force in use of the clutch assembly;
      a first spring seat arranged in contact with the piston and the disc spring adjacent an outer diameter of the disc spring that cooperates with the disc spring and the piston to at least partially define the second cavity; and
      a second spring seat arranged in contact with the housing and the disc spring adjacent an inner diameter of the disc spring that cooperates with the disc spring, the piston, and the housing to at least partially define the second cavity.

2. The transmission of claim 1, further comprising a first sealing element arranged in contact with the first spring seat and the disc spring to seal the second cavity adjacent the outer diameter of the disc spring to resist leakage of hydraulic fluid from the second cavity in use of the clutch assembly.

3. The transmission of claim 2, further comprising a second sealing element arranged in contact with the second spring seat and the disc spring to seal the second cavity adjacent the inner diameter of the disc spring to resist leakage of hydraulic fluid from the second cavity in use of the clutch assembly.

4. The transmission of claim 3, further comprising a third sealing element arranged radially between the first spring seat and the housing.

5. The transmission of claim 1, wherein the second spring seat is constrained against movement relative to the housing in an axial direction.

6. The transmission of claim 5, wherein the second spring seat is constrained against movement relative to the housing in the axial direction by a retaining ring seated in a notch formed in the housing.

7. The transmission of claim 1, wherein the first spring seat has a C-shaped cross section.

8. The transmission of claim 1, wherein the second cavity is at least partially defined by only one piston included in the clutch assembly, and wherein the disc spring is movable relative to the housing in response to movement of the piston relative to the housing in use of the clutch assembly.

9. The transmission of claim 1, wherein the clutch assembly includes a diaphragm in contact with the disc spring that is configured to at least partially conform to the shape of the disc spring in response to movement of the disc spring relative to the housing in use of the clutch assembly, and wherein the diaphragm cooperates with the disc spring, the housing, and the piston to at least partially define the second cavity.

10. A rotating clutch assembly for a transmission, the clutch assembly comprising:
    a housing,
    a piston movable relative to the housing, wherein the piston cooperates with the housing to at least partially define a first cavity that is configured to receive hydraulic fluid such that a first centrifugal pressure force is created in use of the clutch assembly,
    a disc spring movable relative to the housing, wherein the disc spring cooperates with at least one of the housing and the piston to at least partially define a second cavity that is configured to receive hydraulic fluid such that a second centrifugal pressure force is created that at least partially counteracts the first centrifugal pressure force in use of the clutch assembly;
    a first spring seat arranged in contact with the piston and the disc spring adjacent an outer diameter of the disc spring that cooperates with the disc spring and the piston to at least partially define the second cavity; and
    a second spring seat arranged in contact with the housing and the disc spring adjacent an inner diameter of the disc spring that cooperates with the disc spring, the piston, and the housing to at least partially define the second cavity.

11. The clutch assembly of claim 10, further comprising a sealing element arranged in contact with the first spring seat and the disc spring to seal the second cavity adjacent the outer diameter of the disc spring to resist leakage of hydraulic fluid from the second cavity in use of the clutch assembly.

12. The clutch assembly of claim 10, further comprising a sealing element arranged in contact with the second spring seat and the disc spring to seal the second cavity adjacent the inner diameter of the disc spring to resist leakage of hydraulic fluid from the second cavity in use of the clutch assembly.

13. The clutch assembly of claim 10, further comprising a sealing element arranged radially between the first spring seat and the housing.

14. The clutch assembly of claim 10, wherein the second spring seat is constrained against movement relative to the housing in an axial direction by a retaining ring seated in a notch formed in the housing.

15. The clutch assembly of claim 10, wherein the second cavity is at least partially defined by only one piston included in the clutch assembly, and wherein the disc spring is movable relative to the housing in response to movement of the piston relative to the housing in use of the clutch assembly.

16. The clutch assembly of claim 10, further comprising a diaphragm in contact with the disc spring that is configured to at least partially conform to the shape of the disc spring in response to movement of the disc spring relative to the housing in use of the clutch assembly, and wherein the diaphragm cooperates with the disc spring, the housing, and the piston to at least partially define the second cavity.

17. The clutch assembly of claim 10, wherein the disc spring is formed without features that may permit flow of hydraulic fluid therethrough in use of the clutch assembly.

18. The clutch assembly of claim 10, wherein the first spring seat has a C-shaped cross section.

* * * * *